E. L. GILMORE.
PROJECTOR.
APPLICATION FILED JUNE 27, 1919.

1,354,823.

Patented Oct. 5, 1920.
4 SHEETS—SHEET 1.

Inventor
Earl L. Gilmore
By Arthur L. Slee,
Atty.

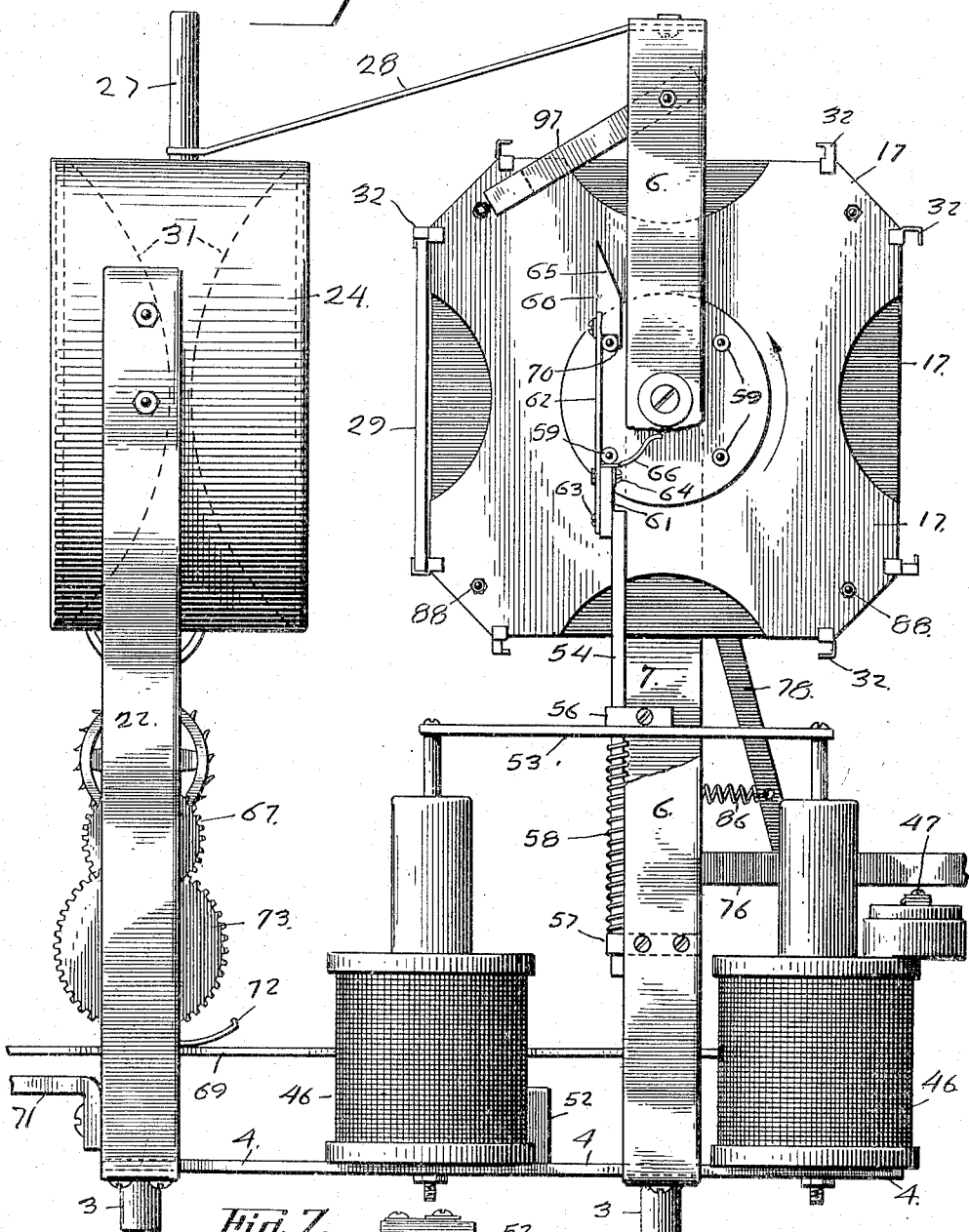

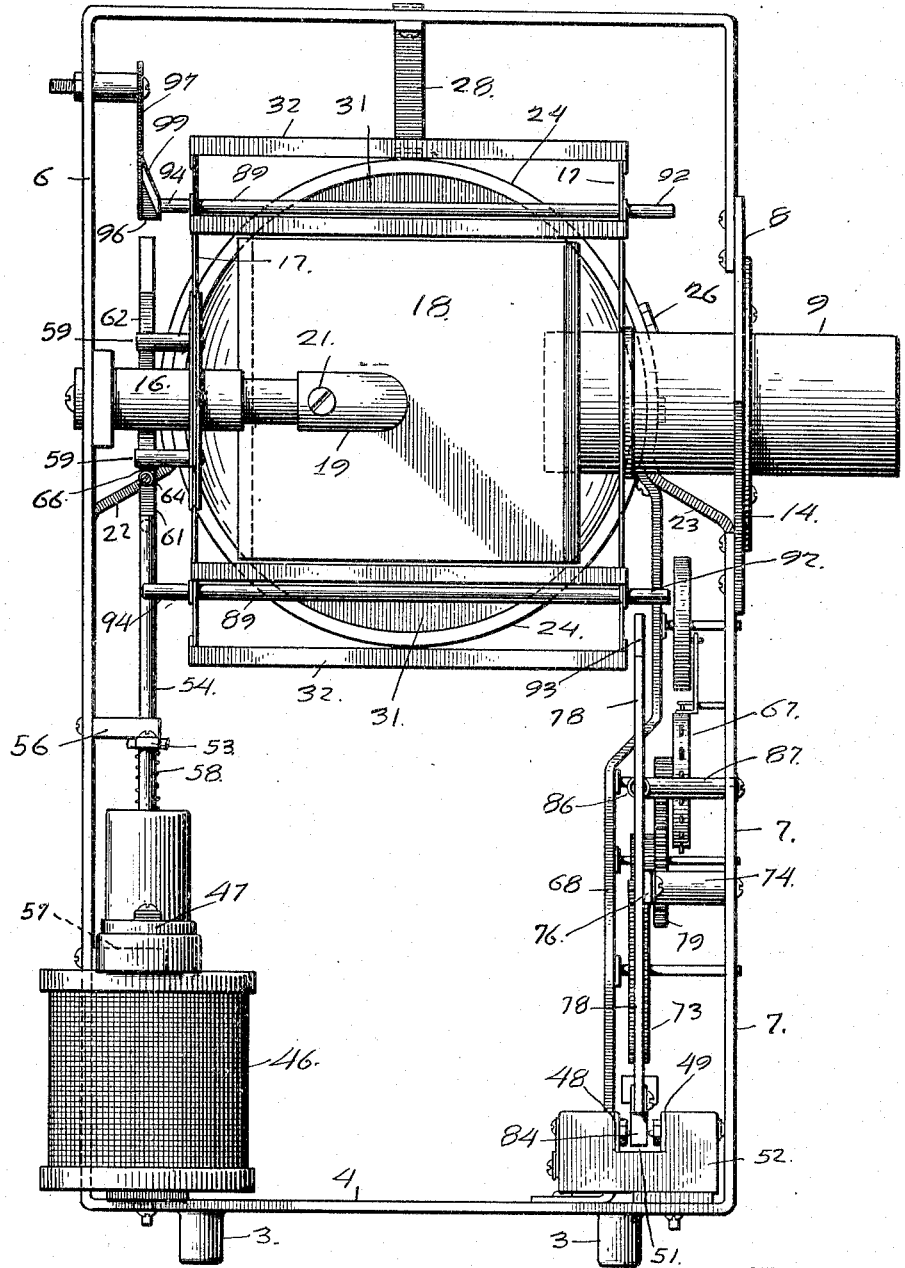

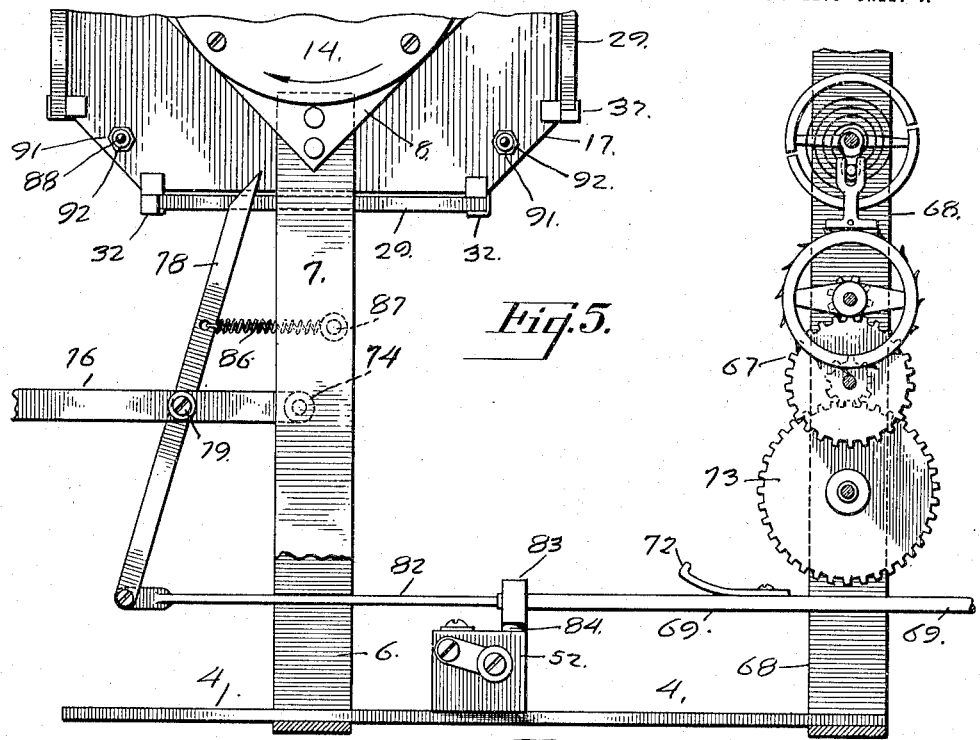
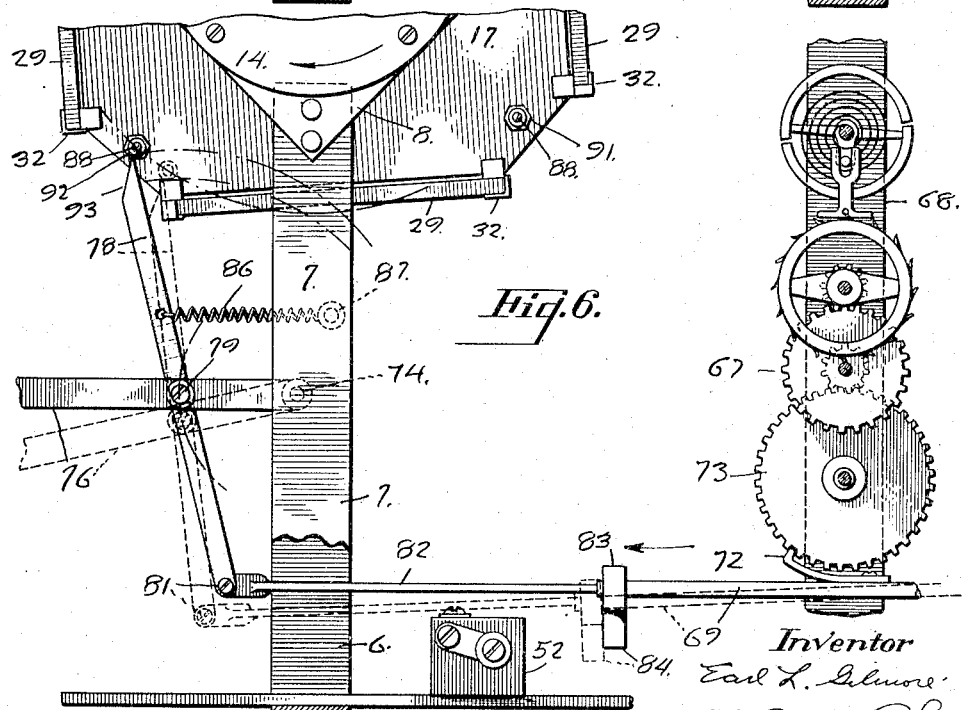

UNITED STATES PATENT OFFICE.

EARL L. GILMORE, OF SAN FRANCISCO, CALIFORNIA, ASSIGNOR TO VITASLIDE COMPANY, OF SAN FRANCISCO, CALIFORNIA, A FIRM.

PROJECTOR.

1,354,823.  Specification of Letters Patent.  Patented Oct. 5, 1920.

Application filed June 27, 1919. Serial No. 308,620.

*To all whom it may concern:*

Be it known that I, EARL L. GILMORE, a citizen of the United States, residing in the city and county of San Francisco and State of California, have invented a certain new and useful Improvement in Projectors, of which the following is a specification.

My invention relates to picture projecting machines in which a slide-carrying element rotates and operates in conjunction with controlling means therefor for successively projecting pictures upon a screen or the like, and has special reference to a projector, in which the slide-carrying element is adapted to operate in conjunction with slides of the type disclosed in Letters Patent No. 1,083,679, issued to me on January 6th, 1914, and in Letters Patent No. 1,113,610, issued to me on October 13th, 1914.

The objects of my invention are:

First, to provide a projector having a rotatable element therein which is adapted to hold and carry slides of the type referred to in the aforementioned patents;

Second, to provide a projector wherein the intermittent motion of the slide-carrying element may be adjusted and timed to occur regularly at such intervals as are most desirable for the projection for pictures from slides of the type specified in the aforementioned patents;

Third, to provide means controllable from the outside of the projector during the operation thereof for adjusting the period during which the slide-carrying element may be held in a projecting position;

Fourth, to provide a projector which is of maximum efficiency and in which the parts are arranged within a minimum compass, so that the projector is of light weight and may be easily moved from one place to another, and so that the cost of packing and shipping the projector may be reduced to a minimum; and Fifth, to provide a projector which is of a simple, cheap and desirable construction and is adapted to operate automatically.

I accomplish these and other objects, which may appear hereinafter, by means of the projector disclosed in the drawings, forming a part of the present specification wherein like characters of reference are used to designate similar parts throughout said specification and drawings, and in which—

Fig. 3 is an enlarged side elevation of the condensing lenses, the operating mechanism of the projector and the mounting therefor, the view being taken from the left of Fig. 4 the casing being removed;

Fig. 4 is an end elevation of the principal parts of the projector, the view being taken from the right of Fig. 3;

Fig. 5 is a broken side elevation of the slide-carrying element and the adjusting and timing mechanism therefor, the slide-carrying element being in projecting position, the lever for actuating the timing mechanism being in its normal, circuit-closing position, and the spring pawl for engaging the clock mechanism also being in its normal non-engaging position;

Figure 1:
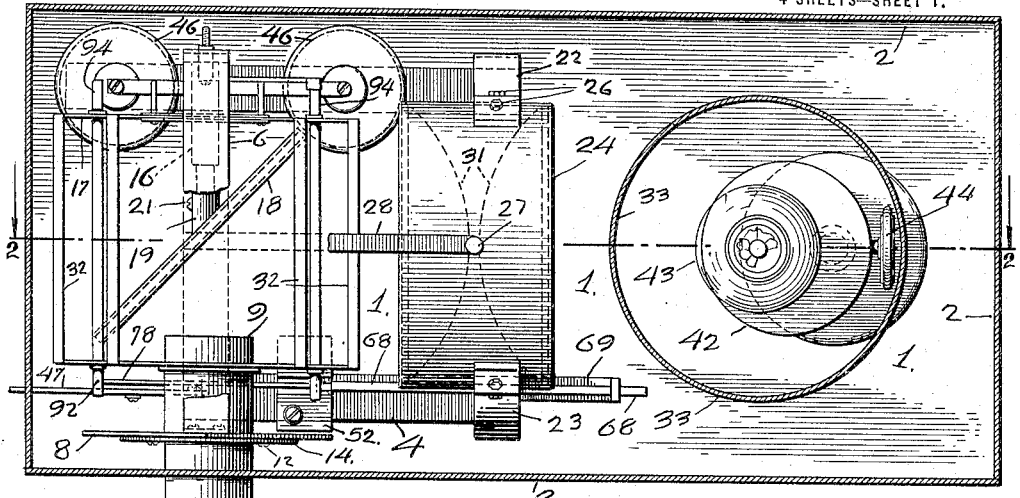
Figure 1 is a horizontal, sectional view of the casing of the projector and tubular member in which the light-radiating means is located, the view being taken in a plane indicated by the line 1—1 in Fig. 2, disclosing in plan the arrangement of the principal parts of my projector.

Fig. 6 is a view similar to Fig. 5, but showing the slide-carrying element during its rotative movement a moment before it assumes a projecting position, the lever for actuating the timing mechanism being ready to be released from engagement with one of the lever-engaging rollers, and said spring pawl in engagement with, and ready to actuate, the retarding mechanism by the action of the coiled spring that automatically returns said lever to its normal position, the adjustment of the timing mechanism for the slide-carrying element being suggested by the indication of said roller, said lever and the adjusting lever, the sliding rod with the electric contacting member thereon in full lines in one position and in dotted lines in another position; and Fig. 7 is a plan view of the electrical contact mechanism, and shows a part of the sliding rod with the contacting member thereon in contact with the springs in the electric circuit.

My projector 1 is provided with the usual casing 2, within which and integral with or otherwise fastened upon legs 3 secured to the bottom of the casing, is a base 4, provided with standards 6 and 7 extending upwardly on the sides of the base and near one end of the casing, said standards being alined with each other and the standard 6 extending to the opposite side where it meets the standard 7 and has its end joined to the end of the standard 7 by a plate 8, which is provided with a central opening in order to admit therethrough a cylindrical shell 9 wherein are mounted the objective lenses of the projector. The shell 9 is rigidly secured to the plate 8 by any suitable means, such as screws 12 extending through a flange 14 upon the shell and screwed into the plate 8.

In axial alinement with the objective lens mounting or shell 9 and extending inwardly from the standard 6 and secured thereto in any suitable manner, is a stud 16, which serves as a journal for one side of a slide-carrying element 17 while the shell 9 serves as a journal for the other side of the element, the axes of the stud 16 and the shell 9 being virtually horizontal, so that the rotation of the element is in a substantially vertical plane. A mirror 18, which has a hollow shank 19 integral therewith or in any other suitable manner secured to the back thereof and fitting over the reduced inner end of the stud 16, is held firmly on the stud by a screw 21 in the shank and is preferably arranged in a substantially vertical plane within the slide-carrying element 17 and at an angle of 45° to the axis of the shell 9, the mirror being otherwise of such a size and shape as will allow rotation of the slide-carrying element around it.

On both sides of the base 4 and at the end thereof opposite to the end where the standards 6 and 7, are located, are other upwardly extending standards 22 and 23, the ends of which are formed to fit over a condensing lens mounting 24 and are provided with screws 26 for holding the condensing lens mounting fastened thereto. In order to further secure the lens mounting and to hold it rigidly in place, a stud 27 is fixed at the top thereof and has attached thereto one end of a strut 28, of which the other end is attached to the top of the standard 6. The arrangement of the fastening means for the lens mounting 24 is such that the mounting is in alinement with the slide-carrying element 17, so that, when one of the slides 29 therein is in projecting position, the light rays through the condensing lenses 31 in the mounting 24, will be projected at right angles to the plane of said slide and as nearly centrally upon the slide as possible, the slide-carrying element 17 for the purpose of holding each slide in proper position being provided with suitable slide retainers 32. The condensing lens mounting 24 is also preferably so arranged that the axis of the lenses 31 therein is at an angle of 45° to the mirror 18, or at the same angle to the mirror as the axis of the objective lenses in the shell 9.

Brazed or otherwise secured to the top of the casing 2 and located near the end thereof opposite to the end adjacent to the slide-carrying element 17, is an open-ended tubular member 33, which preferably is of a cylindrical shape and extends downwardly into the casing. This tubular member is arranged so that its axis is in the median, longitudinal and vertical plane of the casing 2 and has in its wall an opening 34 at such a distance from the top of the casing as to adapt the opening to be alined with the condensing lens mounting 24. Upon the member 33 is fitted a suitable cover 36 provided with a number of holes 37 therein, and the casing 2 has also in its side and near its top a number of holes 38 in order to provide an outlet for the heated air in the casing 2 and thus prevent overheating of the slides 29 in the slide-carrying element 17.

A hollow standard 39 is suitably attached with its base to the bottom of the casing 2 and is preferably so placed that its axis is in the same longitudinal, vertical plane of the casing as the axis of the tubular member 33 but eccentric with the axis of said member. Slidably and rotatably fitted within the standard 39 is a shank 41, which is in eccentric relation to, and extends downwardly from, a horizontal disk 42 within the tubular member 33 and at the lower end thereof, and upon the disk 42 and diametrically opposite to the shank thereof, is attached an electric lamp or other suitable light radiating means 43, which is adapted to be in alinement with the opening 34 and preferably also to have its axis in coincidence with the axis of the tubular member 33. The shank 41 being slidable and rotatable in the standard 39, adjustment of the lamp 43 to the proper horizontal and vertical position is easily accomplished, and the lamp will be securely held in such position by means of a screw 44, which is threaded into the standard and adapted to engage the shank 41.

In order to rotate the slide-carrying element 17 a pair of solenoids 46 is mounted upon the base 4 at one side of the element 17. These solenoids 46 are by any suitable means, for instance, the connection 47, connected in circuit with a source of electrical energy, the circuit and the source of energy not being shown, as the arrangement thereof is well understood in the art and does not constitute a part of this invention. In the circuit and normally insulated from each other, are also connected two contacting springs 48 and 49, the springs being mounted oppositely to each other on the respective side walls of a groove 51 in a stationary insulating block 52.

Connected with the solenoids 46 and operating therewith is a bar 53, and secured to said bar and extending downwardly therethrough is a rod 54 adapted to slide in guide and stop blocks 56 and 57 attached to the standard 6. The rod 54 has mounted thereupon a coiled spring 58, which bears with its lower end against the block 57 and with its upper end against the bar 53, thereby normally holding the bar 53 against the upper block 56 when the electrical circuit is open and the solenoids 46 are deënergized.

Equidistantly spaced apart and equidistantly arranged from the axis of the slide-carrying element 17, pins 59, parallel with said axis and corresponding in number with the total number of slides 29 that may be carried by the element 17, are attached to that side of the element adjacent to which the solenoids 46 are mounted upon the base 4. For simplicity of illustration the number of slides and of pins are shown as four in the present instance, but the number, of course, may be varied according to the capacity of the projector and to the size of the element 17 therein and to what in the judgment of the exhibitor may constitute one series of pictures adapted for projection.

At the upper end of the rod 54 is a part 61, which, although it may be integral with the rod, is preferably separate therefrom and also offset from the rod in order to be directly below and in engagement with a respective pin 59 when one of the slides 29 is in a projecting position, as shown in Fig. 3, the offset part 61 and the lower end of a spring 62 thereon being secured to the rod by a screw 63. The spring 62 is further secured by a screw and nut connection 64 to the outer side of the offset part 61, while by means of the connection 64 a curved spring 66 is also secured to the inner side of the part 61. A member 60, the upper end of which, for a purpose hereinafter explained, is wedge-shaped or inclined, as shown at 65, is secured to the upper end of the spring 62 and has at its lower end a projection 70. The arrangement of the wedge-shaped member 60 is such that, when the slide-carrying element 17 is in projecting position, the lower end of the member rests upon the pin 59 directly above the pin 59 with which the part 61 is in engagement, thus holding the slide-carrying element in a projecting position. Again, when the solenoids 46 are energized, the bar 53 and therewith also the rod 54, the part 61, the spring 62 and the wedge-shaped member 60 are drawn downwardly, thereby turning the slide-carrying element in the direction indicated by the curved arrow in Fig. 3, so that the pin 59 at the upper end of the spring 62 then first comes into a position slightly beyond the position formerly occupied by the pin 59 at the upper end of the offset part 61 and thereby brings the slide that was formerly in projecting position to a non-projecting position at the bottom of the slide-carrying element, while the successive slide at the top of the slide carrying element simultaneously is also carried slightly beyond the projecting position. Immediately thereafter, however, the pin 59 is returned in the opposite direction so that the last-mentioned slide is returned to the projecting position, as shown in Fig. 5, with the roller 88 against the stop 97.

The standard 23, in addition to being a support for one side of the condensing lens mounting 24, also has therein rotatably mounted the outer ends of the arbors for the train of wheels and the escapement in a retarding mechanism 67, and opposite to, and alined with, the standard 23 is an auxiliary standard 68 attached at its bottom to the base 4 and at its top to the standard 23 so as to form a rigid support adapted for rotatably mounting therein the inner ends of said arbors. Directly below, and extending beyond, the retarding mechanism is a rod 69 slidably mounted in a bracket 71, which is suitably secured at the end of the base 4, and to the rod 69 is secured a spring pawl 72 adapted to engage the driving gear 73 of the retarding mechanism, and when said pawl is in such engagement and when the rod 69 is moved in the direction indicated by the straight arrow in Fig. 6, to operate the clock mechanism.

To the standard 7 and below the slide-carrying element 17 is pivotally attached, as at 74, an adjusting lever 76, which extends through a slot 77 in the end wall of the casing 2 in order to be accessible to the operator, the lever having a sufficiently tight connection with the standard 7 or being provided with another suitable means for preventing an accidental movement of said lever. An operating lever 78 is pivotally mounted between its ends, as at 79, to the adjusting lever 76 and has also at its lower end a pivotal connection 81 with the outer end of a rod 82 that is with its inner end threaded into, or otherwise secured to, the rod 69. Screwed upon the rod 69 or otherwise adjustably secured thereto is a member 83, the lower end 84 of which is preferably of a cylindrical shape in order to adapt it to slide between the contact springs 48 and 49, and a contractile spring 86, which is attached with one end to the operating lever 78 and with the other end anchored, for instance, to a stud 87 attached to the standard 7, serves to moves the upper end of the lever 78 inwardly and thereby to hold the contacting end 84 of the member 83 normally in contact with the springs 48 and 49 in order to close the electric circuit whereby the solenoids 46 are energized.

Bolts 88, in number equal to the number of the pins 59 or the number of slides 29 that may be carried by the element 17 are arranged transversely to the slide-carrying element and extend therethrough and on both sides thereof, said bolts 88 like the pins 59 being spaced apart equidistantly and being equidistantly arranged from the axis of the slide-carrying element although farther from said axis than the pins 59. The bolts 88 have preferably thereon separator sleeves 89 between the sides of the slide-carrying element, and nuts 91 are screwed upon the outer ends of the bolts for holding the sides of the element tightly against the sleeves 89. Upon the ends of the bolts 88, toward the lever 78, are sleeves 92, adapted to engage the upper end of the lever 78, which upper end is preferably slanted, as at 93, in order that the lever 78 may be quickly disengaged from said sleeves 92. The opposite ends of the bolts 88 have mounted thereupon similar sleeves 94, adapted to engage a wedge-shaped stop member 96 secured to one end of a spring 97, the other end of which is rigidly fastened to the standard 6.

Figure 2:
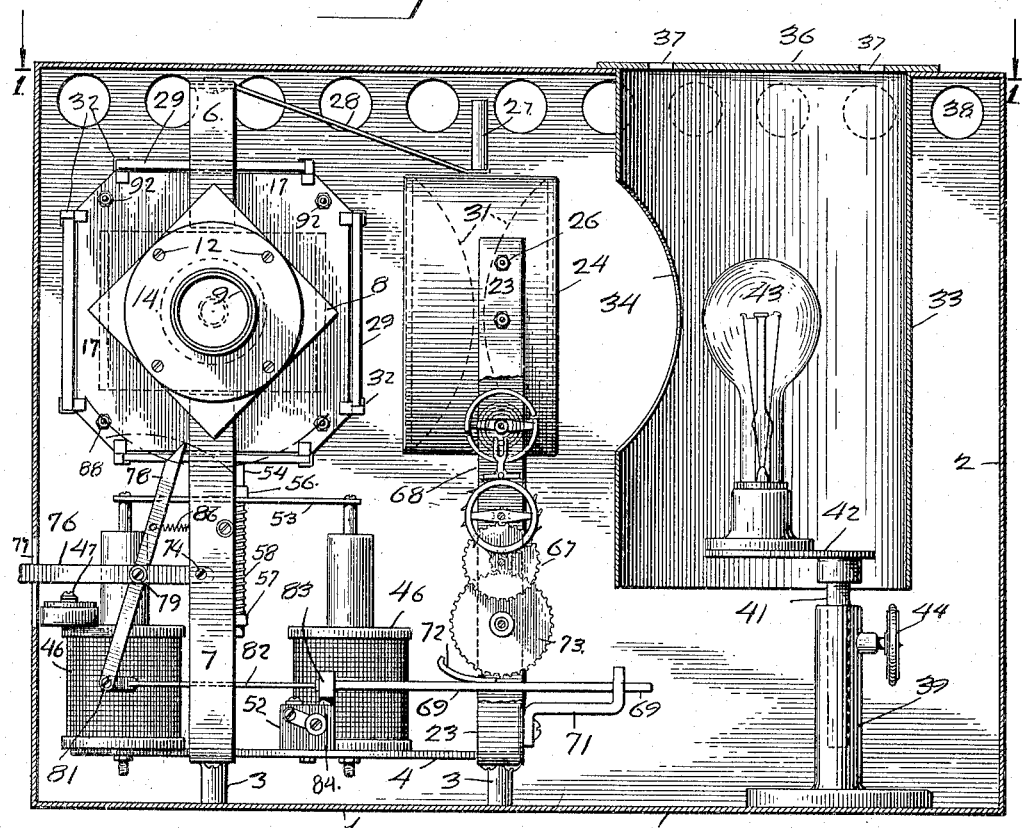
Fig. 2 is a front view of the device with the front removed and parts shown in section.

When the solenoids 46 are energized and the slide-carrying element 17 is rotated in the direction indicated by the curved arrow in Fig. 3, as before described, the sleeve 92 upon the lower bolt 88 nearest the lever 78 engages the upper end of said lever and, against the action of the spring 86, moves said end away from the standard 7, at the same time causing the lower end of the lever to move toward the standard 7 and thus to actuate the rod 69 in the opposite direction from that indicated by the straight arrow in Fig. 6, so that the contacting end 84 of the member 83 on the rod is moved out of contact with the springs 48 and 49 and thereby deënergizing the solenoids 46 to force the spring pawl 72 into engagement with the driving gear 73 of the clock mechanism 67. The slide-carrying element has then been turned to its projecting position, as shown in Fig. 5. In this position of the element 17 the spring 86 would immediately snap back the lever 78 to its normal position, shown in Figs. 2, 3 and 5, were it not for the engagement of the spring pawl 72 with the gear 73 of the retarding mechanism, whereby said lever 78 is retarded in its return movement. As soon as the gear 73 has been moved sufficiently to release the spring pawl 72 from engagement therewith, the spring 86 instantly effects the return movement of the lever 78 to the normal position, and the solenoids 46 are immediately energized, as before described.

In Fig. 6 is suggested in dotted lines the adjustment of the retarded return movement of the rod 69 by the movement of the adjusting lever 76 to a lower position than that shown in full lines. The longitudinal movement of the rod 69, as shown in dotted lines, is shorter than the longitudinal movement of the rod, as shown in full lines, and therefore effects the engagement of the spring pawl 72 with the gear 73 for a shorter period. Consequently, the interval between each two successive picture projections, when the adjusting lever is positioned as indicated by dotted lines, is less than when said lever is in the position shown in full lines. From this it is evident that the length of time for exhibition of each picture is virtually determined by the engagement of the spring pawl 72 with the gear 73 of the retarding clock-mechanism, since the complete intermittent movement of the slide-carrying element 17 is effected so quickly as to be, in fact, instantaneous. By moving the adjusting lever either up or down, the intermittent movement of the slide-carrying element may thus be timed to occur at such intervals as are in the judgment of the exhibitor most desirable for the projection of pictures from the projector 1.

A movement of the slide-carrying element in the opposite direction to that indicated by the curved arrow in Fig. 3 is prevented by the end of the stop member 96, against which the side of the respective sleeve 94 abuts when the slide-carrying element is in a projecting position, while, by means of the slanting surface 99 on the stop member 96, the end of the respective sleeve 94 depresses the spring 97 and thus allows the element to move forward when the member 60 through impulse from the energized solenoids 46 moves the respective upper pin 59 downwardly, as before described, thereby automatically alining the slide 29 in a projective position.

As soon as the solenoids 46 are deënergized, the bar 54 is immediately moved upwardly, thus causing the inclined surface 65 of the member 60 to slide over the pin 59 that is then in position above the respective pin 59 just moved downwardly. While, as before described, during this movement of the member 60 the stop member 96 on the spring 97 prevents a backward movement of the slide-carrying element by engagement with the respective upper pin 59, the curved spring 66 will at the same time engage the respective lower pin 59 and thereby coöperate with the spring 62 in arresting any extreme forward movement that may otherwise occur as a result of the momentum of the element. When the member 60 is moved upwardly, the projection 70 thereon will snap over the respective upper pin 59 and allow the pin to come into engagement with the lower end of the member. The lower respective pin 59 is at that moment directly below the respective upper pin 59 and in engagement with the upper end of the offset part 61, as shown in Fig. 3, so that the slide-carrying element is thus held in a projecting position as long as the spring pawl 72 is in engagement with the gear 73 of the retarding mechanism 67 and thereby causes the electric circuit to remain open.

It is seen from the foregoing that my projector will operate automatically and will project pictures intermittently as long as the exhibitor so desires, and that each picture may be projected for such length of time as is deemed best by the exhibitor.

It is also obvious that, on account of my arrangement whereby the picture on a slide 29 is reflected from the mirror 18 into the objective lenses within the shell 9, the compass of the projector 1 is materially reduced so that a decided advantage is obtained over projectors in which the objective lenses are alined with the condensing lenses in front of the reflecting mirror.

My invention being thus fully and clearly described, what I claim as new and desire to secure by Letters Patent, is:

1. In a projector, the combination with a light-radiating means, of a slide-carrying element rotatably mounted and adapted to have the slides therein alined with the light-radiating means; a condensing lens mounted in alinement with the light-radiating means and between said means and the slide-carrying element; an objective lens mounted at one side of the slide-carrying element; a mirror mounted in the projector and arranged within the slide-carrying element to reflect the pictures projected from the slides to and through the objective lens and thence to a screen outside of the projector; and means for intermittently moving the slide-carrying element to a projecting position.

2. In a projector, the combination with light-radiating means, of a slide-carrying element rotatably mounted on a horizontal axis and adapted to have the slides therein alined with the light-radiating means; a condensing lens mounted in alinement with the light-radiating means and between said means and the slide-carrying element; an objective lens mounted at the side of, and coaxial with, the slide-carrying element; a mirror mounted in the projector and arranged within the slide-carrying element in a substantially vertical plane and at an angle to the axis of the condensing lens and the axis of the objective lens to reflect pictures projected from the slides to and through the objective lens and thence to a screen outside of the projector; and means for intermittently moving the slide-carrying element to a picture-projecting position.

3. In a projector comprising a casing, light-radiating means mounted within the casing near one end thereof; a slide-carrying element mounted within the casing on a horizontal axis and adapted to have the slides therein alined with the light-radiating means; a condensing lens mounted within the casing in alinement with the light-radiating means and between said means and the slide-carrying element; an objective lens mounting secured at one side of the slide-carrying element within, and extending through, the casing and adapted to hold the objective lens therein co-axial with the slide-carrying element; a mirror mounted in the casing and arranged within the slide-carrying element in a substantially vertical plane and at an angle to the axis of the condensing lens and the axis of the objective lens to reflect pictures projected from the slides to and through the objective lens and thence to a screen outside of the casing; and means for intermittently moving the slide-carrying element to a picture-projecting position.

4. In a projector, the combination with a slide-carrying element rotatably mounted on a horizontal axis; an objective lens mounted at the side of, and coaxial with, the slide-carrying element; light-radiating means adjustably mounted so as to be alined with a slide in the slide-carrying element when the slide is in a projecting position; a condensing lens mounted between the light-radiating means and the slide-carrying element and alined with said means and with a slide in said position; a mirror mounted in the projector and arranged within the slide-carrying element in a substantially vertical plane and at an angle to the axis of the condensing lens and the axis of the objective lens to reflect pictures projected from the slides through the objective lens and thence to a screen outside of the projector; and means for intermittently moving the slide-carrying element to a projecting position.

5. In a projector, the combination with a light-radiating means, of a slide-carrying element rotatably mounted and adapted to have the slides therein alined with the light-radiating means; a condensing lens mounted in alinement with the right-radiating means and between said means and the slide-carrying element; an objective lens mounted at one side of the slide-carrying element; a mirror mounted in the projector and arranged within the slide-carrying element to reflect the projected pictures from the slides through the objective lens and thence to a screen outside of the projector; means for intermittently moving the slide-carrying element to a projecting position; and automatically operated means controllable from the outside of the projector for adjusting the period during which the element may be held in a projecting position.

6. In a projector, the combination with light-radiating means, of a slide-carrying element rotatably mounted on a horizontal axis and adapted to have the slides therein alined with the light-radiating means; a condensing lens mounted in alinement with the light-radiating means and between said means and the slide-carrying element; an objective lens mounted at the side of, and coaxial with, the slide-carrying element; a mirror mounted in the projector and arranged within the slide-carrying element in a substantially vertical plane and at an angle to the axis of the condensing lens and the axis of the objective lens to reflect pictures projected from the slides through the objective lens and thence to a screen outside of the projector; means for intermittently moving the slide-carrying element to a projecting position; and automatically operated means controllable from the outside of the projector for adjusting the period during which the element may be held in a projecting position.

7. In a projector comprising a casing, light-radiating means mounted within the casing near one end thereof; a slide-carrying element mounted within the casing on a horizontal axis and adapted to have the slides therein alined with the light-radiating means; a condensing lens mounted within the casing in alinement with the light-radiating means and between said means and the slide-carrying element; an objective lens mounting secured at one side of the slide-carrying element within, and extending through, the casing and adapted to hold the objective lens therein coaxial with the slide-carrying element; a mirror mounted in the casing and arranged within the slide-carrying element in a substantially vertical plane and at an angle to the axis of the condensing lens and the axis of the objective lens to reflect pictures projected from the slides through the objective lens and thence to a screen outside of the casing; means for intermittently moving the slide-carrying element to a picture-projecting position; and automatically operated means controllable from the outside of the casing for adjusting the period during which the element may be held in a projecting position.

In witness whereof I hereunto set my signature.

EARL L. GILMORE.